United States Patent [19]

Steely

[11] Patent Number: 4,839,572

[45] Date of Patent: Jun. 13, 1989

[54] MULTIPLEX MOTOR CONTROL SYSTEM WITH AUTOMATIC MOTOR DEACTIVATION

[75] Inventor: Lee W. Steely, Reinholds, Pa.

[73] Assignee: AMP Incorporated, Harrisburg, Pa.

[21] Appl. No.: 130,351

[22] Filed: Dec. 8, 1987

[51] Int. Cl.$^4$ .............................................. G05B 19/29
[52] U.S. Cl. ..................................... 318/603; 318/565; 318/562
[58] Field of Search ......................... 318/562, 600–603, 318/671, 672, 306, 308, 560–561, 563–566, 101, 103; 361/28–29, 23; 370/58–66

[56] References Cited

U.S. PATENT DOCUMENTS

| | | | |
|---|---|---|---|
| 3,973,256 | 8/1976 | Stoesser | 340/365 E |
| 4,293,947 | 10/1981 | Brittain | 370/89 |
| 4,510,426 | 4/1985 | Michaels et al. | 318/565 |
| 4,682,168 | 7/1987 | Chang et al. | 340/825.65 |

Primary Examiner—William M. Shoop, Jr.
Assistant Examiner—David S. Martin

[57] ABSTRACT

A motor control system includes a motor, a switch which generates a motor activation signal, a motor power source, and a multiplex system. The multiplex system includes a central controller and remote stations coupled to the switch, and to control activation of the motor. The control means controls the second remote station to activate the motor in response to the appearance of the first signal and to deactivate the motor in response to the disappearance of the first signal. The control means also automatically controls the second remote station to deactivate the motor in the event the first signal persists for a time period longer than a motor activation threshold time, thereby automatically preventing excessively long periods of motor activation.

17 Claims, 7 Drawing Sheets

MULTIPLEX MOTOR CONTROL SYSTEM WITH AUTOMATIC MOTOR DEACTIVATION

BACKGROUND OF THE INVENTION

This invention relates to a multiplex motor control system which prevents a motor from being operated for an excessive time period.

Modern automotive vehicles include a number of electric motors which are under either manual or automatic control. Such motors are used for example to control the position of outside mirrors, car windows, power seats, power radio antennas, and the like. In each case, the motor is connected to the driven object by a linkage and operates to drive the linkage to move the driven object between two limits of travel.

Often, such motors can be abused by an operator who commands motor activation for an excessively long time period. Of course, when the driven object reaches its extreme position, further movement is not possible. Some means must be provided to prevent damage to the motor and the drive linkage.

One prior art approach to this problem is to provide a drive linkage which allows the motor to run without moving the driven object. Such linkages are conventionally used in power mirrors. Another approach of the prior art is to sense the current drawn by the motor or the torque exerted by the motor, and automatically to deactivate the motor if the motor torque exceeds a predetermined value.

For some time there has been an interest in applying multiplex systems to control the components of vehicles such as automobiles. Britain U.S. Pat. No. 4,293,947 is one example of such a multiplex system. In spite of this interest, currently available vehicle multiplex systems do not fully exploit the potential of such systems for providing improved control functions in vehicles.

SUMMARY OF THE INVENTION

The present invention is directed to an improved multiplex motor control system which automatically ensures that an operator cannot activate a motor indefinitely with a single depression of a motor control switch. In this way, wear and strain and associated noises on the drive train are minimized.

This invention relates to a motor control system of the type having a motor, a switch comprising means for generating a motor activation signal, a motor power source, and a multiplex system. The multiplex system includes a first remote station coupled to receive the motor activation signal from the switch to generate a first signal in response thereto, a second remote station connected between the motor and the motor power source to selectively activate and deactivate the motor, and control means, interconnected between the first and second remote stations, for controlling the second remote station in response to the first signal to activate the motor in response to the appearance of the first signal and to deactivate the motor in response to the disappearance of the second signal. According to this invention, the control means also includes means for storing a motor activation threshold time along with means for controlling the second remote station to automatically deactivate the motor in the event the first signal persists for a time longer than the motor activation threshold time, thereby automatically preventing excessively long periods of motor activation. Preferably, the motor activation threshold time is set to be slightly greater than the maximum anticipated time required for the motor to drive the associated driven member between its two extreme positions.

This invention provides important advantages. By timing motor activation and automatically deactivating the motor after it has been activated for a preset maximum time, the multiplex system of this invention prevents the motor from being driven indefinitely against its stops. In this way, wear on the drive linkage is reduced. This advantage of operation is obtained without any significant increase in the cost of the multiplex system. This is because the automatic motor deactivation function can be performed by the same remote stations and controller that are normally required for the multiplex system. Only a small amount of programming is required to implement the timing functions described above. Furthermore, since no additional hardware is required to implement the embodiment described below, reliability is not adversely affected in any way.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
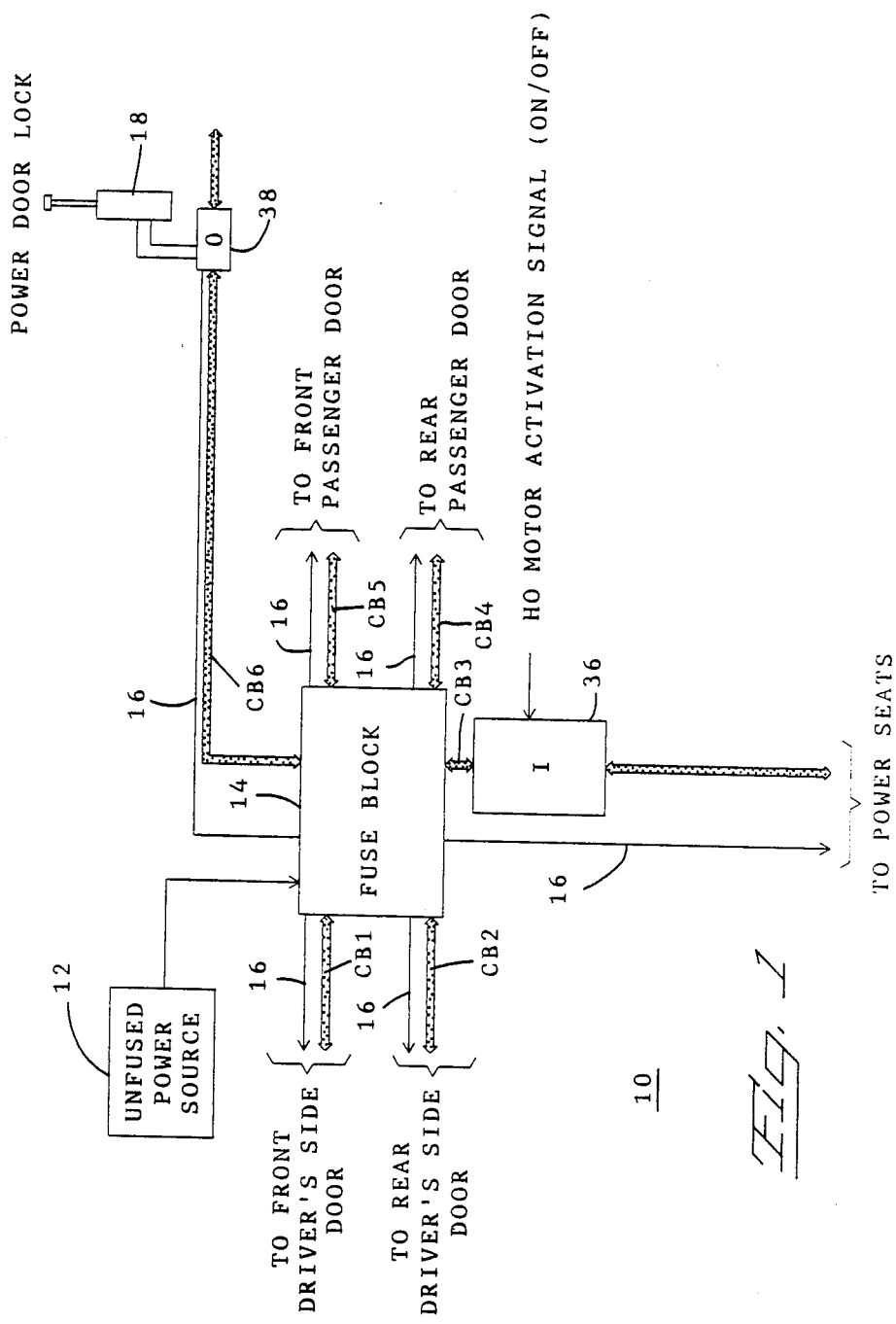
FIG. 1 is a block diagram of a vehicle multiplex system which incorporates a presently preferred embodiment of this invention.

Turning now to the drawings, FIG. 1 shows a vehicle multiplex system 10 which is adapted for use with a vehicle such as an automobile of the type which includes an unfused power source 12 and a fuse block 14. A number of DC power buses 16 radiate from the fuse block 14, along with a number of parallel control buses CB1–CB6. FIG. 1 is not intended to show the entire multiplex system of the vehicle, but only those portions are important to understanding the operation of this embodiment. As shown in FIG. 1, control bus CB3 receives an input signal M0 indicative of whether a power lock motor 18 is to be switched on or off. The control bus CB6 controls power as described below to the power lock motor 18.

Figure 2:
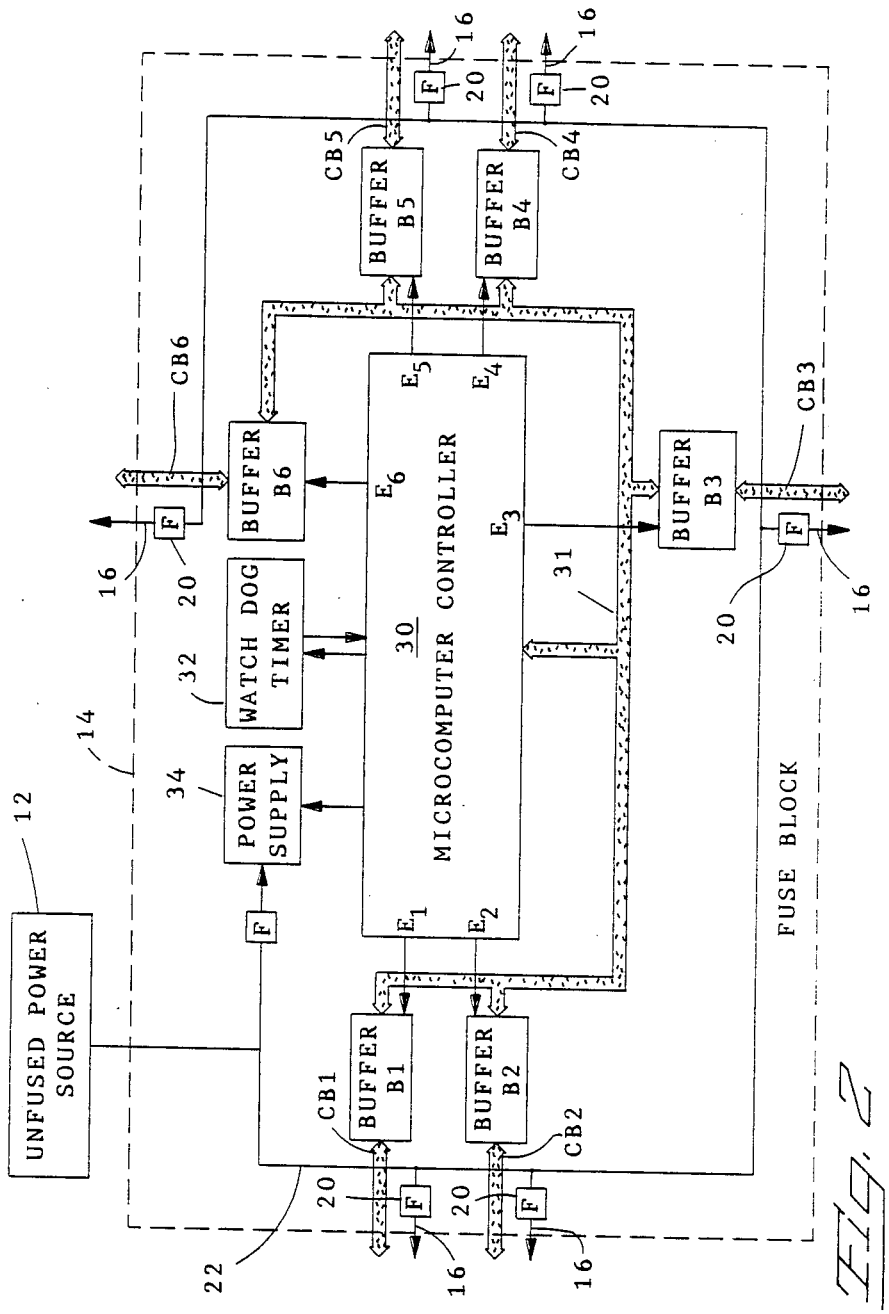
FIG. 2 is a block diagram of the fuse block of FIG. 1.

FIG. 2 shows a more detailed block diagram of the fuse block 14. Fuses 20 are interconnected between the unfused power source 12 and each of the power buses 16. In addition, the fuse block 14 includes a microcomputer controller 30, a watch dog timer 32, a power supply 34, and a number of buffers B1–B6. The controller 30 applies control signals to a control bus 31 and reads multiplexed signals from the control bus 31, and the buffers B1–B6 are controlled to ensure that the control bus 31 is interconnected with only one of the control buses CB1–CB6 at any given time. In this way, the total length of active control bus is minimized, thereby reducing electromagnetic interference and noise susceptibility. Reliability is also improved in that a short in any one of the control buses CB1-CB6 will not interfere with proper operation of the remaining control buses.

Figure 3:
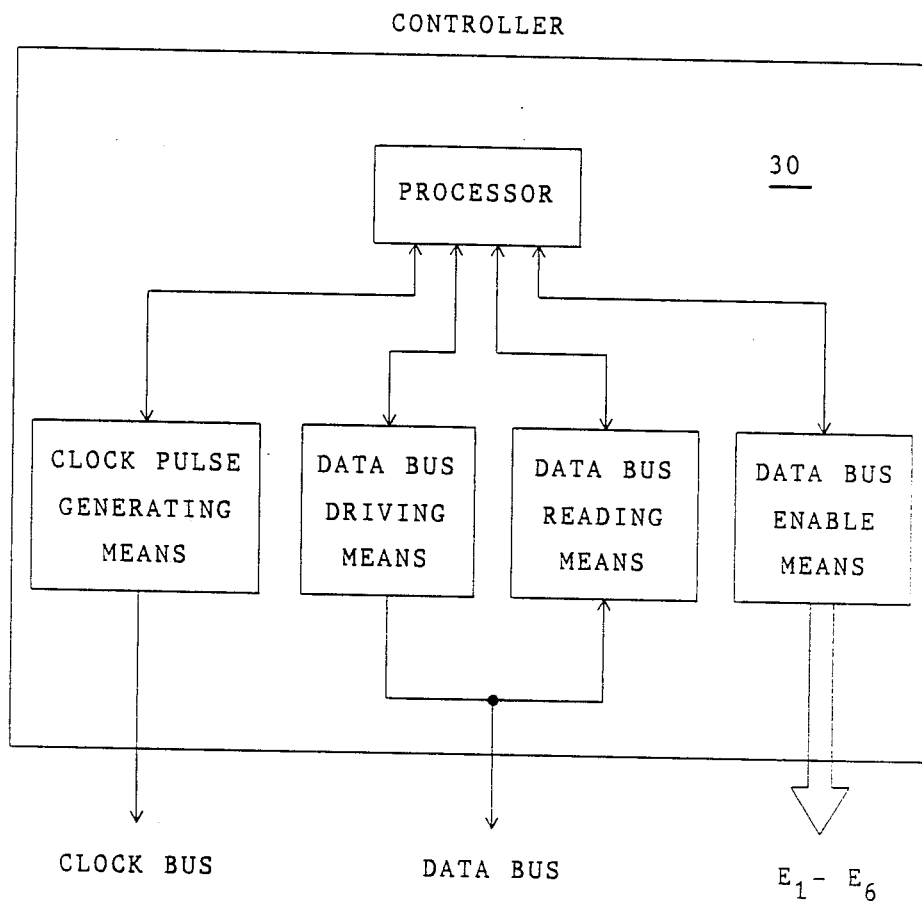
FIG. 3 is a block diagram of the controller of FIG. 2.

As shown in FIG. 3, the controller 30 includes a clock pulse generating means which generates sets of clock pulses on a clock bus, along with data bus driving means and data bus reading means for applying multiplexed signals to and reading multiplexed signals from a data bus, respectively. The clock and data buses are both included in the control bus 31. The controller 30 also includes buffer enable means which generates enable signals E1-E6 to control the buffers B1-B6, and each of these four means is controlled by a processor.

The processor controls the clock pulse generating means to generate clock pulses in sets separated by a period of no clock pulses. Each set of clock pulses comprises n subsets, where n is equal to the total number of separately addressed remote stations, as described below. Each subset includes eight clock pulses, and each clock pulse defines a respective data transmission time slot or channel on the data bus. Thus, each remote station is enabled for one subset of clock pulses (consisting of eight clock pulses and therefore eight time slots) within each set of clock pulses. The processor maintains a table of the state of all of the data channels, including both commands (sent from the controller 30 to the remote stations) and responses (sent from the remote stations to the controller 30). The data bus driving means of the controller 30 uses this table to drive the data bus high or low as appropriate to ensure that commands are sent by the controller 30 to the remote stations at appropriate times to transmit the command portion of the table. The data bus reading means of the controller 30 samples and stores the state of the data bus at appropriate times to ensure that responses from the remote stations are stored in appropriate locations of the table.

The multiplex system 10 includes input units 36 and output units 38 that are coupled to the control buses. The input units 36 convert standard signals into a time multiplexed format and apply them at appropriate times to the respective control buses. The output units 38 read the state of the data bus of the control bus at selected times, and latch the reading, which is then used for control purposes.

Figure 5:
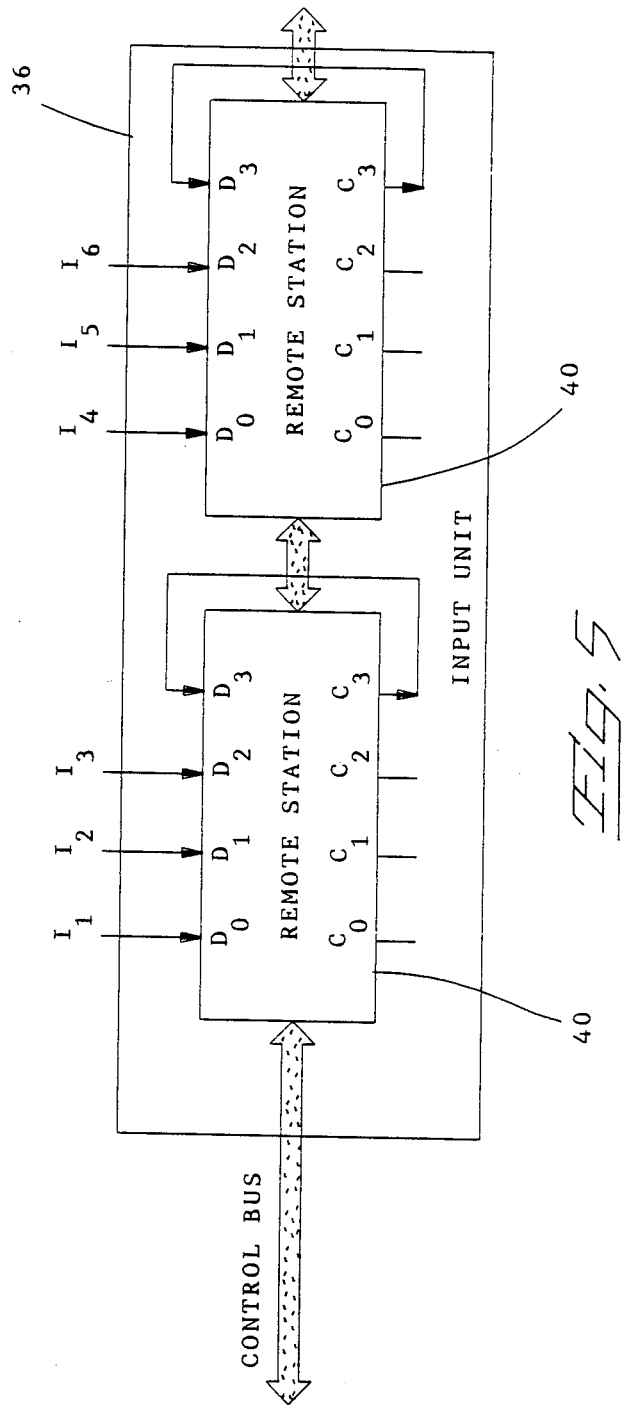
FIG. 5 is a block diagram of one of the input units of FIG. 1.

FIG. 5 shows a block diagram of one of the input units 36. As shown in FIG. 5, each input unit 36 includes two remote stations 40, each of which has inputs D0-D3 for four data signals to be multiplexed and applied to the control bus, and outputs C0-C3 for four command signals which are read from the control bus, demultiplexed, and applied as outputs on the respective terminals. As shown in FIG. 5, control output C3 is applied directly to data input D3 to check for proper operation of each remote station 40.

Figure 4:
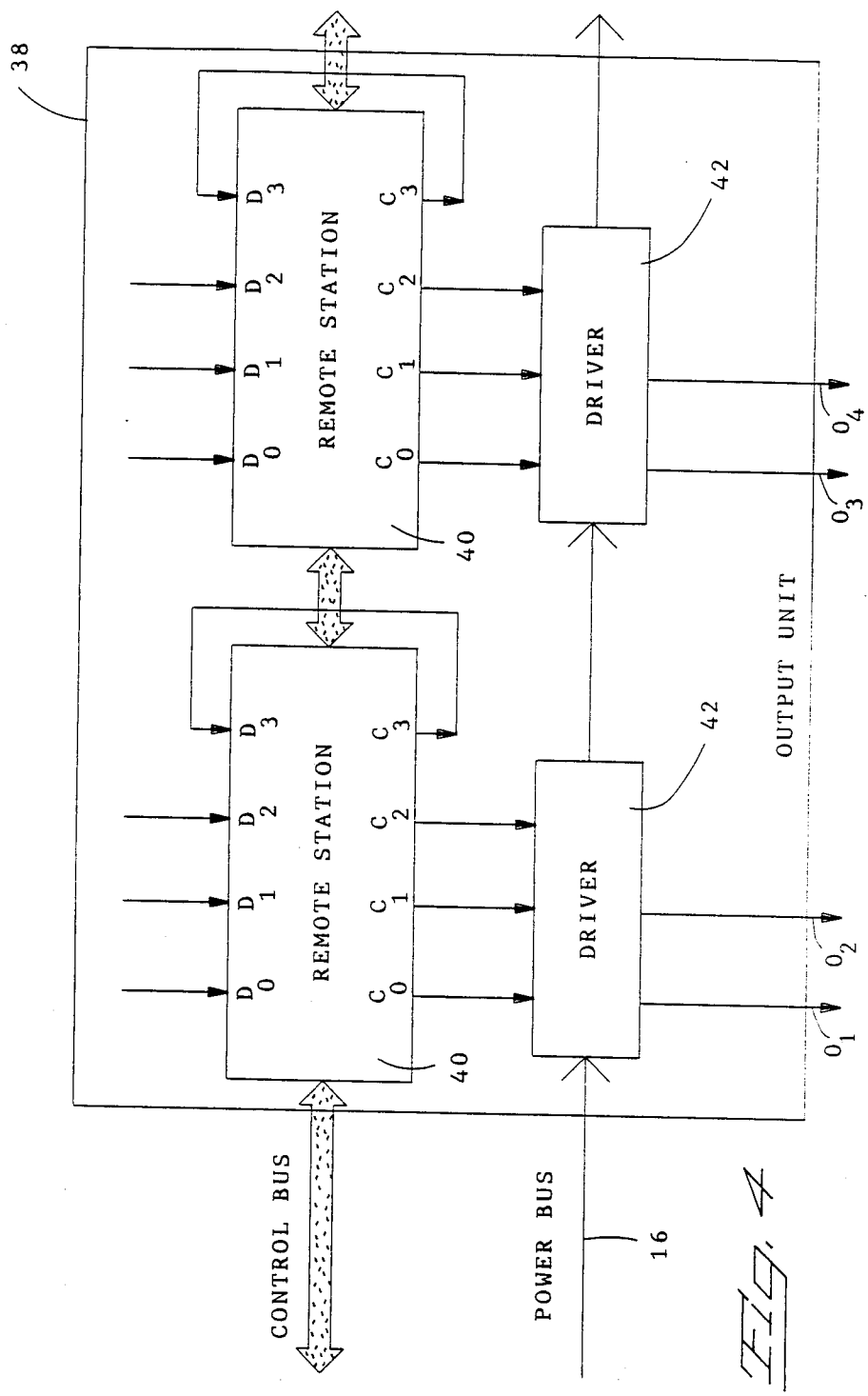
FIG. 4 is a block diagram of one of the output units of FIG. 1.

FIG. 4 shows a block diagram of one of the output units 38, which also includes two remote stations 40 of the type described above. Each output unit 38 also includes two drivers 42 which are interconnected with the power bus 16. Depending upon the state of the control signals C0-C2, the drivers 42 either apply 12 VDC or 0 VDC to power outputs 01-04.

Figure 6:
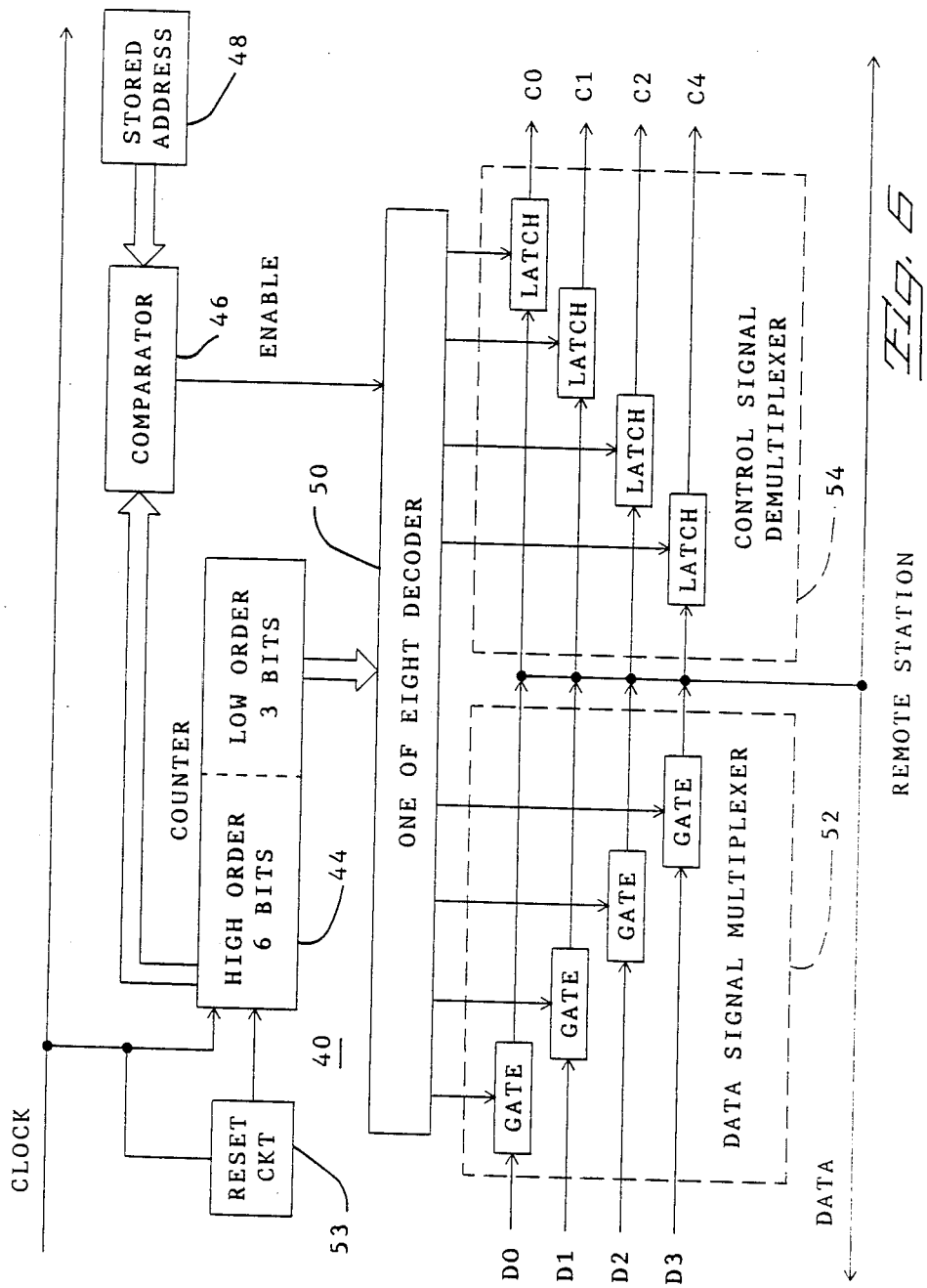
FIGURE 6 is a block diagram of one of the remote stations of 4 and 5.

FIG. 6 shows a block diagram of one of the remote stations 40, which interacts with both the clock bus and the data bus included in the control bus. Each remote station 40 includes an eight bit counter which has a higher order 6 bit section and a lower order 3 bit section. This counter is responsive to the clock pulses on the clock bus. The high order 6 bits of the counter 44 are compared in a comparator 46 with a stored 6 bit address stored in the means 48. When the high order 6 bits of the counter 44 are equal to the stored address in the means 48, the comparator 46 enables a decoder 50 that decodes the low order 3 bits of the counter 44. Typically, each of the remote stations 40 in the system will have a unique address. The remote station 40 includes a data signal multiplexer 52 which includes four gates, each operating to gate a respective one of the data signals D0-D3, as well as a control signal demultiplexer 54 which includes four latches, each arranged to latch and hold a respective one of the control signals C0-C3. Each of the gates and each of the latches is connected to the data bus included in the control bus.

For the eight clock pulse cycles during which the comparator 46 enables the decoder 50, the decoder 50 sequentially enables respective ones of the gates and latches. When any one of the gates is enabled, it applies the respective data signal D0-D3 to the data bus. Similarly, when any of the latches is enabled, it latches and holds the state of the data bus at the corresponding time, and applies the latched state as a command signal C0-C3.

In order to synchronize the counter 44 with the controller 30, the remote station 40 includes a reset circuit 53 which monitors the clock bus for an absence of clock pulses. Whenever the reset circuit 53 fails to detect a clock pulse for a selected time interval, the reset circuit resets the counter 44 to zero. The controller transmits the clock pulses in sets, and each set is separated by a period of no clock pulses longer than the selected time interval of the reset circuit 53. Thus, the reset circuit 53 resets the counter 44 between each set of clock pulses.

The present invention is not limited to the particular type of vehicle multiplex system described above; however, further features of this multiplex system can be found in U.S. patent application Ser. No. 107,623 (filed Oct. 9, 1987), which defines the presently preferred construction for the fuse block 14, buses CB1-CB6, input and output units 36, 38; 064,917 (filed June 19, 1987), which defines the presently preferred structure for the driver 42; and 837,911 (filed Mar. 10, 1986), which defines the presently preferred structure for the data bus driving and reading means of the controller; along with U.S. Pat. No. 4,682,168, which defines the presently preferred embodiment for the remote station 40. In addition, the discussion of the Type A remote stations in U.S. patent application Ser. No. 921,185, filed Oct. 21, 1986, provides additional information about the remote station 40. All of these patent documents are hereby incorporated by reference.

Figure 7:
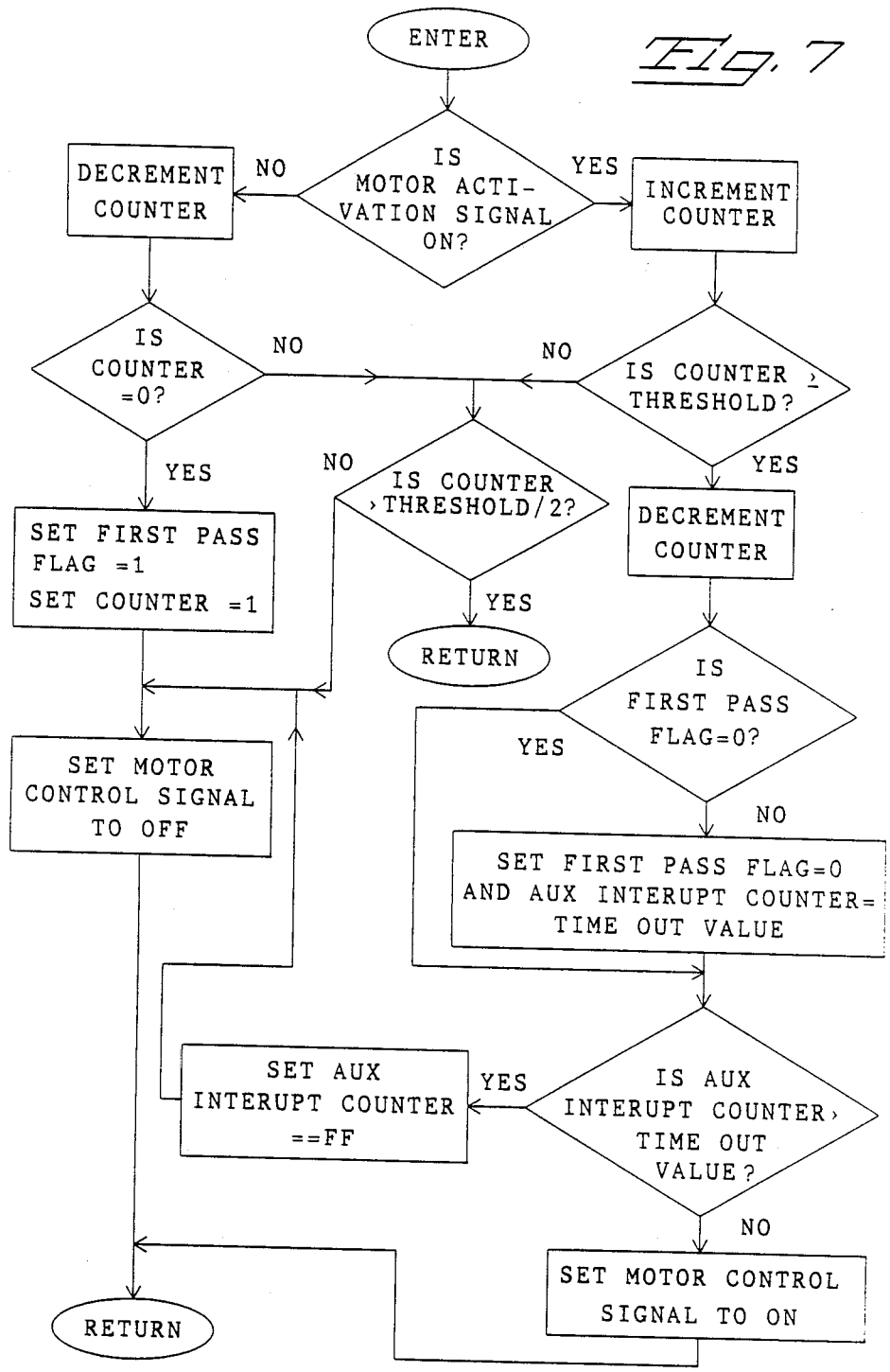
FIG. 7 is a flow chart of a program executed by the controller of FIG. 2 to control the motor 18.

According to this invention, the controller reads the state of the motor activation signal M0 from the input unit 36 via the data bus and then controls the appropriate output unit 38 so as to activate or deactivate the motor 18. FIG. 7 shows a flow chart of the program used to determine whether the motor 18 is to be turned on or off. The program of FIG. 7 is responsive to the motor activation signal and sets a motor control signal. The motor activation signal M0 is either on or off, depending upon whether the operator is commanding that the motor 18 be activated or deactivated. Similarly, the motor control signal is either on or off. When the motor control signal is on, the data bus driving means of the controller 30 generates a time multiplexed signal which is received by the appropriate output unit 38 and which commands the appropriate output unit 38 to disconnect the motor 18 from the power bus. Similarly, when the motor control signal is off, the data bus driving means of the controller 30 generates a time multiplexed signal which, when received by the associated output unit 38, causes the motor 18 to be connected to the power bus 16.

The initial step in the program of FIG. 7 is to check the status of the motor activation signal M0. Depending upon the state of the motor activation signal a counter is either incremented or decremented. This counter is used to store an integrated number indicative of the recent history of the motor activation signal. The counter is decremented each time the motor activation signal is checked and found to be in the off state, and the counter is incremented each time the motor activation signal is checked and found to be in the on state. The multiplex system cycles with a period of 2 milliseconds, and thus the motor activation signal state is checked every 2 milliseconds. If the motor activation signal is in the off state and the counter is decremented, the counter is then checked for equality with zero. If the counter is equal to zero the counter is set to 1, and First Pass Flag is also set to 1. Then the motor control signal is set to off and the routine returns.

If the counter is decremented but it is not equal to zero, the counter is then compared with a lower threshold equal to Threshold/2. If the counter is greater than Threshold/2 the routine returns without taking further action. Otherwise, the motor control signal is set to the off state and the routine returns.

On the other hand, if the motor activation signal is in the on state, then the counter is incremented and then compared with the variable Threshold. If the counter is less than or equal to Threshold, then the counter is compared with Threshold/2. If the counter is less than or equal to Threshold/2 then the motor control signal is set to off, and the routine returns. Otherwise, the routine returns without modifying the state of the motor control signal.

Once the counter is incremented to a point where it is greater than or equal to Threshold, the counter is decremented and the variable First Pass Flag is then tested for equality with zero. If First Pass Flag is not equal to zero (indicating that the counter was incremented past Threshold on this pass through the routine) then First Pass Flag is set equal to zero and an auxiliary interrupt counter is set equal to the variable Timeout Value. The auxiliary interrupt counter is a hardware counter included in the processor which is automatically decremented every 62.5 milliseconds in an interrupt service routine. The auxiliary interrupt counter is then compared with Timeout Value. If the auxiliary interrupt counter is less than or equal to Timeout Value, then the motor control signal is set to the on state and the routine returns. Otherwise, the auxiliary interrupt counter is set equal to FF, the motor control signal is set to off, and the routine returns.

In the program of FIG. 7, the upper threshold, Threshold, is a parameter used to ensure that noise and intermittent signals due to switch bounce do not interfere with proper operation of the system. For example, with a multiplex system that cycles every 2 milliseconds a value of Threshold equal to 24 has been found suitable. This means that the motor activation signal must be in the on state for about 50 milliseconds before the counter is incremented to a point where it is greater than or equal to Threshold. Furthermore, the use of the lower threshold, Threshold/2, ensures that noise in the multiplex system does not interfere with proper operation of the auxiliary interrupt counter. In particular, no action is taken with respect to either the state of the motor control signal or the state of the auxiliary interrupt counter during the period when the counter is decremented from Threshold to Threshold/2. This is an important feature of this embodiment which materially enhances system operation in a noisy operating environment.

In the program of FIG. 7, the auxiliary interrupt counter is used as a timer to time the period the motor control signal is in the on state. Timeout Value stores a maximum value in sixteenths of a second that the motor will be allowed to operate in an uninterrupted fashion. Typically, Timeout Value should be set slightly larger than the maximum time required for the motor to drive the associated driven element between its two limits of travel. In this example, there will be a characteristic maximum time period for the motor to move the door lock mechanism between the two extreme limits, depending upon variables such as ambient temperature and voltage. Preferably, Timeout Value is set slightly greater than this maximum anticipated travel time, measured in sixteenths of a second. For example, if the maximum travel time is anticipated to be 1 second, Timeout Value should be set to 16.

In the first pass through the routine after the counter has been incremented past Threshold, the auxiliary interrupt counter is set equal to Timeout Value, and the auxiliary interrupt counter is then automatically decremented by the interrupt service routine. The motor control signal is set to on with each pass through the routine of FIG. 7 when the counter is greater than or equal to Threshold until the auxiliary interrupt counter has been decremented through zero. At this point, the auxiliary interrupt counter is set to FF and the motor control signal is turned off.

In this way, the routine of FIG. 7 automatically monitors the duration of the time period the motor 18 is turned on, and automatically turns the motor 18 off after a maximum allowed activation time. All of this is accomplished without in any way increasing the hardware requirements of the multiplex system or in any way adversely affecting the reliability of the multiplex system.

The object code listing of Table Appendix A performs the functions flow charted in FIG. 8. This object code is intended for execution on an Intel 8051 microprocessor. The following inputs and flags are located in the listed addresses:

| | |
|---|---|
| COUNTER | 0AH |
| FIRST PASS FLAG | 2BH.0 |
| THRESHOLD | 48 DECIMAL |
| TIMEOUT VALUE | 16 DECIMAL (1 SEC) |
| AUX INTERRUPT COUNTER | 44H |
| MOTOR ACTIVATION SIGNALS | 30H, BITS 5,6 |
| | 37H, BITS 1,2 |
| MOTOR CONTROL SIGNALS | 23H, 24H, 28H, 2AH |

Of course, it should be understood that a wide range of changes and modifications can be made to the preferred embodiments described above. For example, this invention is not limited to use with power door locks, but can be applied to a wide range of motors, including power seats, power windows, and power mirrors in an automotive vehicle, as well as other motors outside of the automotive vehicle setting. Furthermore, this invention is not limited to use with multiplex systems of the type described above, but rather can be adapted for use with a wide range of multiplex systems, including systems with a greater or lesser number of conductors in the control bus, fiber optic based control buses, for example.

It is therefore intended that the foregoing detailed description be regarded as illustrative rather than limiting, and that it be understood that it is the following claims, including all equivalents, which are intended to define the scope of this invention.

APPENDIX A

| MEMORY ADDRESS | | | | | | | | | | | | | | |
|---|---|---|---|---|---|---|---|---|---|---|---|---|---|---|
| 000E8C: | D2 | D3 | C2 | D4 | E5 | 30 | 30 | E5 | 24 | 30 | E6 | 21 | E5 | 37 | 30 | E1 |
| 000E9C: | 1C | 30 | E2 | 19 | DA | 11 | 7A | 01 | D2 | 58 | 43 | 23 | 0F | 43 | 24 | 0F |
| 000EAC: | 43 | 28 | 0F | 43 | 2A | 0F | 22 | BA | 0C | 00 | 40 | EE | 22 | 0A | BA | 18 |
| 000EBC: | 00 | 40 | F4 | 1A | 30 | 58 | 05 | 75 | 44 | 10 | C2 | 58 | 74 | 10 | C2 | AF |
| 000ECC: | B5 | 44 | 00 | D2 | AF | 50 | 05 | 75 | 44 | FF | 80 | CE | E5 | 30 | A2 | E6 |
| 000EDC: | E5 | 37 | 82 | E1 | 92 | 1B | 92 | 23 | 92 | 43 | 92 | 53 | A2 | E2 | E5 | 30 |
| 000EEC: | 82 | E5 | 92 | A1 | 92 | 22 | 92 | 42 | 92 | 52 | 82 | 1B | 40 | 0A | A2 | 67 |
| 000EFC: | 92 | 19 | 92 | 21 | 92 | 41 | 92 | 51 | 22 | | | | | | | |

I claim:

1. In a motor control system of the type having a motor; a switch comprising means for generating a motor activation signal; a motor power source; a multiplex system comprising a first remote station coupled to receive the motor activation signal from the switch and to generate a first signal in response thereto, a second remote station connected between the motor and the motor power source to selectively activate and deactivate the motor, and control means, interconnected between the first and second remote stations, for controlling the second remote station to activate the motor in response to the appearance of the first signal and to deactivate the motor in response to disappearance of the first signal; the improvement comprising the following elements included in the control means:
   means for sampling the first signal on a periodic basis;
   a counter adapted to store a count;
   means for incrementing the count when the first signal is in a first state indicative of motor activation;
   means for decrementing the count when the first signal is in a second state indicative of motor deactivation;
   means for supplying an upper threshold and a lower threshold;
   means for setting a motor control signal to activate the motor when the count of the counter is greater than the upper threshold;
   means for setting the motor control signal to deactivate the motor when the count is less than the lower threshold;
   means for starting a timer when the count is incremented past the upper threshold;
   means for storing a maximum activation time;
   means for setting the motor control signal to deactivate the motor when the timer reaches the maximum activation time; and
   means for leaving the motor control signal and the timer unchanged when the count is between the upper and lower thresholds.

2. The system of claim 1 wherein the first remote station generates the first signal as a time multiplexed signal.

3. The system of claim 1 wherein the controller is interconnected with the remote stations by clock and data buses, wherein the controller comprises means for generating sets of clock pulses on the clock bus, and wherein the remote stations each comprise means for counting the clock pulses and for interacting with the data bus at selected times defined by the clock pulses.

4. The system of claim 1 wherein the lower threshold is equal to one half of the upper threshold.

5. The system of claim 1 wherein the upper threshold is greater than 20 and less than 30.

6. The system of claim 5 wherein the sampling means samples the first signal every 2 milliseconds.

7. The system of claim 1 wherein the timer is automatically decremented by an interrupt service routine included in controller.

8. The system of claim 1 further comprising means for maintaining the count within the range between zero and the upper threshold.

9. The system of claim 1 wherein the motor control system further comprises a driven member driven between two extreme positions by the motor, and wherein the motor activation threshold time is indicative of a maximum anticipated time required for the motor to drive the driven member between the extreme positions.

10. In a motor control system of the type having a motor; a switch comprising means for generating a motor activation signal; a motor power source; a multiplex system comprising a first remote station coupled to receive the motor activation signal from the switch and to generate a first signal in response thereto, a second remote station connected between the motor and the motor power source to selectively activate and deactivate the motor, and control means, interconnected between the first and second remote stations, for controlling the second remote station to activate the motor in response to the appearance of the first signal and to deactivate the motor in response to disappearance of the first signal; the improvement comprising:
   second means, included in the control means, for storing a motor activation threshold time; and
   third means, included in the control means, for controlling the second remote station to automatically deactivate the motor in the event the first signal persists for a time period longer than the motor activation threshold time, thereby automatically preventing excessively long periods of motor activation.

11. The system of claim 10 wherein the motor control system further comprises a driven member driven between two extreme positions by the motor, and wherein the motor activation threshold time is indicative of a maximum anticipated time required for the motor to drive the driven member between the two extreme positions.

12. The system of claim 10 wherein the first remote station generates the first signal as a time multiplexed signal.

13. The system of claim 10 wherein the controller is interconnected with the remote stations by clock and data buses, wherein the controller comprises means for generating sets of clock pulses on the clock bus, and wherein the remote stations each comprise means for counting the clock pulses and for interacting with the data bus at selected times defined by the clock pulses.

14. The system of claim 10 wherein the control means comprises means for integrating the first signal in a selected range to form a count;

means for indicating the appearance of the first signal when the count passes an upper threshold, and
means for indicating the disappearance of the first signal when the count is below a lower threshold.

15. The system of claim 14 wherein the third means classifies the first signal as persisting whenever the count is than the lower threshold.

16. The system of claim 15 wherein the upper threshold is substantially equal to twice the lower threshold.

17. The system of claim 16 wherein the controller comprises means for maintaining the count in a range between zero and the upper threshold.

* * * * *

UNITED STATES PATENT OFFICE
CERTIFICATE OF CORRECTION

Patent No. 4,839,572      Dated June 13, 1989

Inventor(s) Lee W. Steely

It is certified that error appears in the above-identified patent and that said Letters Patent is hereby corrected as shown below:

In column 8, claim 7, line 28, after "in" add --the--

In column 10, claim 15, line 7, after "count is" add --greater--

Signed and Sealed this

Thirteenth Day of March, 1990

Attest:

JEFFREY M. SAMUELS

*Attesting Officer*     *Acting Commissioner of Patents and Trademarks*